(12) United States Patent
Fieau et al.

(10) Patent No.: US 12,348,595 B2
(45) Date of Patent: Jul. 1, 2025

(54) METHOD FOR DELEGATING THE DELIVERY OF CONTENT ITEMS TO A CACHE SERVER

(71) Applicant: Orange, Issy-les-Moulineaux (FR)

(72) Inventors: Frédéric Fieau, Chatillon (FR); Emile Stephan, Chatillon (FR); Gaël Fromentoux, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 225 days.

(21) Appl. No.: 17/927,220

(22) PCT Filed: May 20, 2021

(86) PCT No.: PCT/FR2021/050904
§ 371 (c)(1),
(2) Date: Nov. 22, 2022

(87) PCT Pub. No.: WO2021/240098
PCT Pub. Date: Dec. 2, 2021

(65) Prior Publication Data
US 2023/0224378 A1 Jul. 13, 2023

(30) Foreign Application Priority Data
May 25, 2020 (FR) ...................................... 2005481

(51) Int. Cl.
*H04L 67/566* (2022.01)
*H04L 9/40* (2022.01)
(Continued)

(52) U.S. Cl.
CPC ........ *H04L 67/566* (2022.05); *H04L 63/0428* (2013.01); *H04L 67/2871* (2013.01); *H04L 67/568* (2022.05)

(58) Field of Classification Search
CPC ............... H04L 67/566; H04L 63/0428; H04L 67/2871; H04L 67/568
See application file for complete search history.

(56) References Cited

U.S. PATENT DOCUMENTS

| | | | |
|---|---|---|---|
| 7,171,692 B1 * | 1/2007 | DeMello | G06Q 30/06 719/315 |
| 7,991,156 B1 * | 8/2011 | Miller | H04N 21/835 726/30 |

(Continued)

OTHER PUBLICATIONS

Jiang, Yanyan, et al. "CARE: Cache guided deterministic replay for concurrent Java programs." Proceedings of the 36th International Conference on Software Engineering. 2014.*

(Continued)

*Primary Examiner* — Jimmy H Tran
(74) *Attorney, Agent, or Firm* — Knobbe, Martens, Olson & Bear, LLP (57) ABSTRACT

The advent of end-to-end encryption systems has put an end to the use of "caching" methods which consisted of replicating and storing data flows relating to content items in a "cache" which is located on board one or more intermediate devices. However, the disappearance of these "caching" solutions affects the management of the resources of different communication devices, particularly by bringing about an increase in the number of connections between communication devices that is necessary for delivering content items to the user terminals. Unlike known "caching" techniques in which the content itself is stored in at least one cache memory of a cache server, the method relies on storing in a cache server all of the messages exchanged between the original server hosting the content and the cache server, leading to the delivery of the content to the cache server.

15 Claims, 2 Drawing Sheets (51) Int. Cl.
  *H04L 67/2871* (2022.01)
  *H04L 67/568* (2022.01)

(56) References Cited

U.S. PATENT DOCUMENTS

| | | | | |
|---|---|---|---|---|
| 2002/0010798 A1* | 1/2002 | Ben-Shaul | ............. | H04L 67/52 |
| | | | | 707/E17.116 |
| 2003/0063750 A1* | 4/2003 | Medvinsky | ............. | H04L 65/70 |
| | | | | 380/277 |
| 2003/0093694 A1* | 5/2003 | Medvinsky | ........... | G06Q 20/367 |
| | | | | 380/279 |
| 2003/0140257 A1* | 7/2003 | Peterka | .................. | H04L 9/083 |
| | | | | 257/E23.1 |
| 2003/0221099 A1* | 11/2003 | Medvinsky | ......... | H04L 63/0807 |
| | | | | 713/153 |
| 2004/0054779 A1* | 3/2004 | Takeshima | ............ | H04L 67/563 |
| | | | | 709/225 |
| 2005/0014489 A1* | 1/2005 | Zhigang | .............. | H04M 3/4938 |
| | | | | 455/414.2 |
| 2005/0108556 A1* | 5/2005 | DeMello | ................. | G06F 21/10 |
| | | | | 713/189 |
| 2006/0031407 A1* | 2/2006 | Dispensa | ................ | H04L 61/25 |
| | | | | 709/219 |
| 2007/0061456 A1* | 3/2007 | Waris | .................. | G06F 21/6218 |
| | | | | 709/225 |
| 2009/0100147 A1* | 4/2009 | Igarashi | ............. | H04N 21/4826 |
| | | | | 709/218 |
| 2009/0220080 A1* | 9/2009 | Herne | ................. | H04L 63/0428 |
| | | | | 380/255 |
| 2010/0036893 A1* | 2/2010 | Serval | .................. | H04L 63/083 |
| | | | | 709/219 |
| 2010/0299722 A1* | 11/2010 | Tewari | ................. | H04L 69/329 |
| | | | | 726/3 |
| 2012/0089700 A1* | 4/2012 | Safruti | ................. | H04L 67/568 |
| | | | | 709/217 |
| 2012/0124375 A1* | 5/2012 | Truskovsky | ........ | H04L 63/0869 |
| | | | | 713/168 |
| 2012/0124384 A1* | 5/2012 | Livni | .................... | H04L 63/126 |
| | | | | 713/178 |
| 2012/0185370 A1* | 7/2012 | Davie | .................... | G06Q 30/04 |
| | | | | 713/176 |
| 2012/0213494 A1* | 8/2012 | Barton | ................. | H04N 21/812 |
| | | | | 386/248 |
| 2013/0117400 A1* | 5/2013 | An | ........................ | H04L 9/3263 |
| | | | | 709/206 |
| 2013/0191627 A1* | 7/2013 | Ylonen | ................. | H04L 63/166 |
| | | | | 713/150 |
| 2013/0227271 A1* | 8/2013 | Pampagnin | ......... | G06F 21/1086 |
| | | | | 709/202 |
| 2013/0238808 A1* | 9/2013 | Hallem | ................. | H04L 69/03 |
| | | | | 709/227 |
| 2013/0336221 A1* | 12/2013 | Damola | .............. | H04L 61/2539 |
| | | | | 370/328 |
| 2014/0047232 A1* | 2/2014 | Hannel | ................. | H04L 63/105 |
| | | | | 713/154 |
| 2014/0115724 A1* | 4/2014 | van Brandenburg | ....................... | |
| | | | | H04L 63/0807 |
| | | | | 726/30 |
| 2014/0245359 A1* | 8/2014 | De Foy | .............. | H04N 21/6181 |
| | | | | 725/62 |
| 2014/0344897 A1* | 11/2014 | Cholas | .................... | H04L 63/10 |
| | | | | 726/4 |
| 2014/0359064 A1* | 12/2014 | Rizzo | ....................... | G06F 21/10 |
| | | | | 709/217 |
| 2015/0052349 A1* | 2/2015 | Gero | ..................... | H04L 9/0891 |
| | | | | 713/153 |
| 2016/0026824 A1* | 1/2016 | Hars | ....................... | G06F 21/78 |
| | | | | 726/26 |
| 2016/0087933 A1* | 3/2016 | Johnson | .............. | H04L 41/0803 |
| | | | | 709/245 |
| 2016/0224768 A1* | 8/2016 | Boccon-Gibod | ....... | G06F 21/62 |
| 2016/0248590 A1* | 8/2016 | Benson | ............... | H04W 12/128 |
| 2016/0261676 A1* | 9/2016 | Nishimoto | ............. | H04L 67/06 |
| 2016/0321294 A1* | 11/2016 | Wang | .................... | H04L 67/568 |
| 2016/0337426 A1* | 11/2016 | Shribman | ............... | H04L 65/65 |
| 2017/0164200 A1* | 6/2017 | Näslund | ............. | H04W 12/069 |
| 2017/0244680 A1* | 8/2017 | Chen | .................... | H04L 63/0428 |
| 2017/0244682 A1* | 8/2017 | Chen | .................... | H04L 63/0485 |
| 2017/0250979 A1* | 8/2017 | Benson | ................. | H04L 63/102 |
| 2017/0295132 A1* | 10/2017 | Li | ....................... | H04L 61/3015 |
| 2017/0316185 A1* | 11/2017 | Park | ...................... | G06F 21/105 |
| 2017/0353522 A1* | 12/2017 | Van Brandenburg | ... | H04L 67/01 |
| 2018/0084306 A1* | 3/2018 | Hunter | .................. | H04H 60/66 |
| 2018/0248969 A1* | 8/2018 | Zhu | ........................ | H04L 9/3213 |
| 2019/0036908 A1* | 1/2019 | Liu | .......................... | H04L 9/14 |
| 2019/0166177 A1* | 5/2019 | Zhao | .................... | G06F 12/0811 |
| 2019/0199818 A1* | 6/2019 | Su | .......................... | H04L 65/61 |
| 2019/0372943 A1 | 12/2019 | Stephan et al. | | |
| 2019/0387055 A1* | 12/2019 | Varvello | ............. | H04L 41/5067 |
| 2020/0236220 A1* | 7/2020 | Lawson | ............. | H04M 7/0021 |
| 2021/0029080 A1* | 1/2021 | Shribman | ........... | H04L 61/4511 |
| 2021/0136047 A1* | 5/2021 | Wilson | ................. | H04L 9/0861 |
| 2022/0150220 A1* | 5/2022 | Verheyen | ................ | H04L 9/50 |
| 2022/0272174 A1* | 8/2022 | Shribman | ............. | H04L 67/567 |
| 2022/0366001 A1* | 11/2022 | Shribman | ............... | H04L 67/01 |
| 2022/0368676 A1* | 11/2022 | Shribman | ............... | H04L 67/56 |

OTHER PUBLICATIONS

Veeraraghavan, Kaushik, et al. "DoublePlay: Parallelizing sequential logging and replay." ACM Transactions on Computer Systems (TOCS) 30.1 (2012): 1-24.*

Hooshmand, Salman, et al. "Recovering user-interactions of Rich Internet Applications through replaying of HTTP traces." Journal of Internet Services and Applications 9 (2018): 1-27.*

Yan, Mengjia, Yasser Shalabi, and Josep Torrellas. "ReplayConfusion: Detecting cache-based covert channel attacks using record and replay." 2016 49th Annual IEEE/ACM International Symposium on Microarchitecture (MICRO). IEEE, 2016.*

International Search Report for International Patent Application No. PCT/FR2021/050904, dated Aug. 6, 2021.

* cited by examiner

METHOD FOR DELEGATING THE DELIVERY OF CONTENT ITEMS TO A CACHE SERVER

CROSS-REFERENCE TO RELATED APPLICATIONS

This application is filed under 35 U.S.C. § 371 as the U.S. National Phase of Application No. PCT/FR2021/050904 entitled "METHOD FOR DELEGATING THE DELIVERY OF CONTENT ITEMS TO A CACHE SERVER" and filed May 20, 2021, and which claims priority to FR 2005481 filed May 25, 2020, each of which is incorporated by reference in its entirety.

BACKGROUND

Field

The field of the development is that of delivering content items to at least one terminal.

More particularly, the development relates to a method for "caching" data flows relating to content items, also called "transparent caching", with a view to their delivery to at least one terminal.

Description of the Related Technology

End-to-end encryption (E2EE) is a technique used in communication systems where only communication devices having established a connection with each other can access the content items of certain data transmitted by means of the connection, the data useful for routing may be unencrypted.

End-to-end encryption systems are designed to resist any attempt to monitor or modify the data, because no third party can decrypt, and therefore access, the data thus communicated if they do not have the security keys used for the encryption and decryption.

Thus, the content items of the messages transmitted to the recipient communication device is encrypted locally by the emitter communication device even before the messages are sent through the connection, established on a communication path comprising intermediate devices. These intermediate devices, of the "middlebox" type for example, only relay encrypted messages, based on unencrypted routing data, and it is the recipient communication device that decrypts the message. The transaction is thus secured independently of the intermediate device which could be compromised. End-to-end encryption has become an increasingly widespread practice on the Internet.

The advent of this type of solution has put an end to the use of two "caching" methods consisted of replicating and storing data relating to content items, such as web pages or multimedia content items, from a "cache" which is located on board one or more intermediate devices.

A first method, called "explicit cache" is mainly implemented in corporate proxies.

In such a method, a corporate proxy, for example, stores a content item frequently viewed or downloaded by employees and then serves that content item directly from one of its "cache" memories without re-requesting the content item from the server of content items.

A second method, called "transparent cache", is in turn generally implemented by a device of an intermediate communication network which relays the packets between terminals and original servers of the content items. Such a "cache" identifies, among all the requests for processed content item requests, the requests relating to popular content items, for example the most requested and/or the most voluminous content items, and stores a copy of these content items. The "cache" then processes the requests relating to these content items, emanating from user terminals, partially replacing the terminal requesting the content item and partially replacing the server supplying the data relating to the required content item, in order to relay the signalling data usually exchanged between the terminal and the server such as signalling data such as http headers, cookies, access control, etc. and to deliver these content items directly from one of its "cache" memories.

However, the disappearance of these "explicit cache" and "transparent caching" solutions affects the management of the resources of the different communication devices, particularly by bringing about an increase in the number of connections and the throughput between communication devices that is necessary for delivering content items to the user terminals.

There is therefore a need for a technique that does not have such disadvantages.

SUMMARY

The development relates to a method for delivering at least one content item to at least one terminal, said method being implemented by a cache server, which can be accessed by said at least one terminal (10), and comprising:
  a first phase during which the following steps are implemented:
    recording a sequence of messages exchanged between the cache server and an original server hosting the content item during a communication session established with the original server associated with said content item and during which said content item is delivered,
  a second phase during which the following steps are implemented:
    receiving a request for access to said content item emitted by the terminal,
    in response to said request for access to said content item, replaying, with said terminal, the sequence of recorded messages, resulting in the delivery of said content item.

Such a solution allows a terminal wishing to access a content item to be able to access the latter, in particular when the original server hosting the content item is not or no longer connected to a communication network.

By delegating the delivery of content items to cache servers, it is possible to reduce the costs of performing this function of delivering content items. Indeed, by delegating the delivery of content items to a cache server, it is possible to reduce the number of connections between communication devices in order to deliver content items, in particular by reusing the existing connections between the user devices and the cache servers. Such a reduction in the number of connections between communication devices leads to a reduction in the energy consumption of these communication devices.

Unlike known "caching" techniques in which the content itself is stored in at least one cache memory of a cache server, the proposed solution relies on storing in the cache server an identical copy of all of the messages exchanged between the original server hosting the content item and the cache server, leading to the delivery of the content to the cache server.

Unlike "transparent caching" techniques, the replay can be carried out to several terminals at the same time in the same point-to-multipoint connection called IP multicast.

Thus, when a terminal wishes to access a given content item, the cache server replays with the terminal the sequence of messages previously exchanged between the original server hosting the content item and the cache server having led to the delivery of the content item to the cache server. The term replay consists in repeating, by the cache server and with the terminal, the sequence of messages exchanged between the original server and the cache server when downloading the required content item, the replayed messages being able, if necessary, to be modified to adapt to the context wherein they are replayed.

Such a solution of delegating the delivery of content items also has increased performance. This is due to the number of connections established between communication devices in order to deliver a content item.

Finally, the proposed solution of delivering content items is reliable. Indeed, within the framework of the described method for delivering content items, a cache server implementing the delivery of content items is provided with an authorisation to execute this function of delivering content items which can be checked if necessary.

In an implementation of the delivery method of the development, said method comprises, after receiving a request for access to said content item, transmitting to the terminal a message comprising at least one setting, called the delegation setting, relating to an authorisation to deliver said content item by said cache server.

The delegation setting is generated by an original server associated with the content item to be delivered and is specific to each cache server to which a naming identifier resolution function is delegated. Thus, only a cache server authorised by an original server associated with a content item to be delivered is delegated the delivery of this content item.

In an implementation of the delivery method of the development, a part of the messages exchanged between the cache server and the original server comprise protocol information relating to the signalling and/or controlling of said sequence of recorded messages. In an implementation of the delivery method of the development, the latter comprises, prior to the replay of the sequence of recorded messages, a step of modifying at least one of the messages of said recorded sequence of messages by means of said protocol information.

For this purpose, the cache server modifies some of the memorised messages in order to adapt them to the emission/reception points, that is to say the cache server and the terminal, if they are different from those of the initial set of messages, that is to say if they are different from the messages exchanged between the original server and the cache server when downloading the required content item. For this purpose, the cache server makes these modifications on the basis of the protocol information generated by the original server.

Such modifications to messages may be performed by the cache server either before replaying the sequence of messages or on the fly when replaying the messages.

In an implementation of the delivery method of the development, the latter comprises a step of emitting additional protocol information to the terminal.

Such additional protocol information relates to values to be applied to the messages identified in the protocol information when they are modified. Additional protocol information is generated by the cache server based on information received from the terminal. Thus, if the protocol information can be common to several terminals, the additional protocol information is specific to the terminal.

In an implementation of the delivery method of the development, the step of modifying at least one of the messages of the sequence is triggered by the reception of a replay request emitted by the terminal.

In an implementation of the delivery method of the development, said method comprises, prior to the step of transmitting the delegation setting, a step of receiving a message comprising the delegation setting.

In a particular implementation of the method, the received message is emitted by said original server associated with the content item to be delivered.

Thus the original server associated with a content item to be delivered directly transmits the delegation setting to the cache server. This allows to reduce the time of delivering content items while reducing the number of connections between devices.

In this implementation, a naming identifier resolver supposed to resolve a particular naming identifier relays a message, transmitted by the original server associated with the content item to be delivered and comprising the delegation setting, to the concerned cache server. In this implementation, the naming identifier resolver supposed to resolve a particular naming identifier is thus informed of the delegation of the delivery of the content item in question.

The development also relates to a method for accessing a content item, said method being implemented by a terminal and comprising the following steps:

emitting a request for access to said content item to a cache server at which said content item is memorised, replaying, with said cache server, a sequence of messages exchanged between the cache server (13) and a server called original server associated with said content item during a communication session established between the cache server and the original server during which said content item is delivered to the cache server, said sequence of messages having been recorded by said cache server, resulting in the delivery of said content item to the terminal.

The terminal receives the delegation setting from the cache server when establishing a communication session with the latter.

In an implementation of the access method of the development, the latter comprises, prior to the replay step, a step of receiving a message, emitted by a server called cache server, comprising at least one setting, called delegation setting, relating to an authorisation for executing a function of delivering said content item by said cache server.

In an implementation of the access method of the development, part of the messages exchanged between the cache server and the original server of the protocol information relating to the signalling and/or controlling of said sequence of recorded messages. In such an implementation, the access method comprises a step of modifying at least one of the messages of said sequence of messages recorded by means of said protocol information.

For this purpose, the terminal modifies, creates or deletes the values of header fields of certain http messages initially exchanged between the original server and the cache server with a view to replaying, between the cache server and the terminal, the sequence of messages recorded by the cache server.

Such message modifications can be made by the terminal either before replaying the sequence of messages or on the fly during message replay.

In an implementation of the access method of the development, the latter comprises a step of receiving additional protocol information.

Thus, such additional protocol information is specific to the terminal.

In an implementation of the access method of the development, the method comprises a step of checking the authenticity of said delegation setting. Checking the authenticity of the delegation setting comprises:
  emitting a request for information relating to said cache server to a naming identifier resolver,
  receiving a message comprising a cryptographic key associated with the original server associated with said content item and the delegation setting,
  checking the delegation setting transmitted by the cache server using the cryptographic key and the delegation setting transmitted by the naming identifier resolver.

In order to ensure the authenticity of the delegation setting transmitted by the cache server, the terminal interrogates a naming identifier resolver which is considered to be a reliable device. The terminal then checks the authenticity of this delegation setting prior to any request for access to a content item in order to ensure the reliability of the cache server with regard to the delivery of the content item in question.

The development also relates to a cache server which can be accessed by at least one terminal, said server hosting data being authorised to deliver at least one content item to the terminal, the cache server comprising means for:
  during a first phase:
    recording a sequence of messages exchanged between the cache server and an original server hosting the content item during a communication session established with the original server associated with said content item and during which said content item is delivered to the cache server,
  during a second phase:
    receiving a request for access to said content item emitted by the terminal,
    in response to said request for access to said content item, replaying, with said terminal, the sequence of recorded messages, resulting in the delivery of said content item.

The development also relates to a terminal requiring access to a content item, and comprising means for:
  emitting a request for access to said content item to a cache server at which said content item is memorised,
  replaying, with said cache server, a sequence of messages exchanged between the cache server and a server called original server associated with said content item during a communication session established between the cache server and the original server during which said content item is delivered to the cache server, said sequence of messages having been recorded by said cache server, resulting in the delivery of said content item to the terminal.

The development finally relates to computer program products comprising program code instructions for implementing the methods as described previously, when they are executed by a processor.

The development also relates to a recording medium readable by a computer on which are recorded computer programs comprising program code instructions for the execution of the steps of the methods according to the development as described above.

Such a recording medium can be any entity or device capable of storing programs. For example, the medium may include a storage means, such as a ROM, for example a CD ROM or a microelectronic circuit ROM, or else a magnetic recording means, for example a USB key or a hard disk.

On the other hand, such a recording medium can be a transmissible medium such as an electrical or optical signal, which can be conveyed via an electrical or optical cable, by radio or by other means, so that the computer programs it contains are executable remotely. The programs according to the development can in particular be downloaded from a network, for example the Internet network.

Alternatively, the recording medium may be an integrated circuit wherein the programs are incorporated, the circuit being adapted for executing or for being used in the execution of the aforementioned methods of the development.

BRIEF DESCRIPTION OF THE DRAWINGS

Other purposes, features and advantages of the development will appear more clearly upon reading the following description, given by way of a simple illustrative and non-limiting example, in relation to the figures, among which.

DETAILED DESCRIPTION OF CERTAIN ILLUSTRATIVE EMBODIMENTS

The general principle of the development is based on the delegation of the delivery of content items usually carried out by original servers hosting content items to be delivered, called original servers of the content items in the rest of the document, to cache servers, such as web servers, managed for example by an internet service provider. Such cache servers implement an "intermediate cache" function and are referred to in the rest of the document as cache servers.

Thus, a cache server stores in at least one of its cache memories content items transmitted by the original servers of said content items in a primitive form corresponding to the flows of packets exchanged when downloading these content items from the original servers of said content items. Then the cache server transmits this content item to a client located on board a terminal without reconnecting to the original server of the content item identified in a request requesting the provision of the content item.

For this purpose, the cache server communicates to the client located on board a terminal protocol data exchanged with the original server of the required content item.

The cache server transmits to the client located on board the terminal the primitive form of the flow of packets exchanged with the original server of the required content item.

Figure 1:
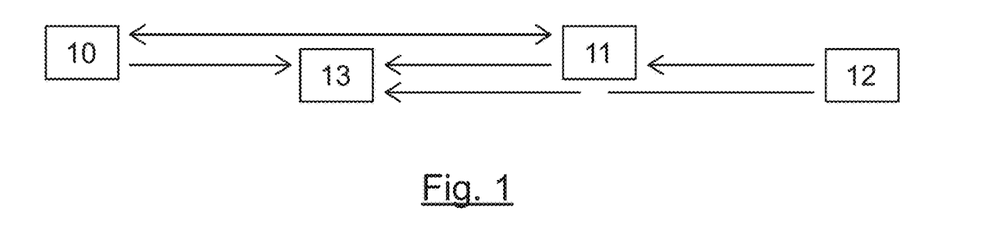
FIG. 1 figure shows a system wherein the methods of the development are implemented.

FIG. 1 shows a system wherein the methods of the development are implemented.

The system comprises at least one terminal 10 requiring access to at least one content item, such as a web page or multimedia content item, a cache server 13 whose naming identifier is for example journal.fr, at least one naming identifier resolver 11, at least one original server 12 whose naming identifier is for example journal.fr, hosting at least one content item to be delivered, for example a web page referenced journal.fr/news/week19 and storing data relating to the content item requested by the terminal 10 such as data relating to the web page journal.fr/news/week19 or data relating to a downloadable content item, etc.

The terminal 10 can exchange messages with the cache server 13 and with the naming identifier resolver 11. A terminal 10 is a device that can emit requests to obtain a content item such as a personal computer, a home gateway, a digital television decoder, a smartphone, a sensor, etc.

The naming identifier resolver 11 receives messages from the original server 12 of the content item and exchanges messages with the cache server 13.

These various exchanges of messages between these different devices as well as their content items are explained in more detail later in this document.

Figure 2:
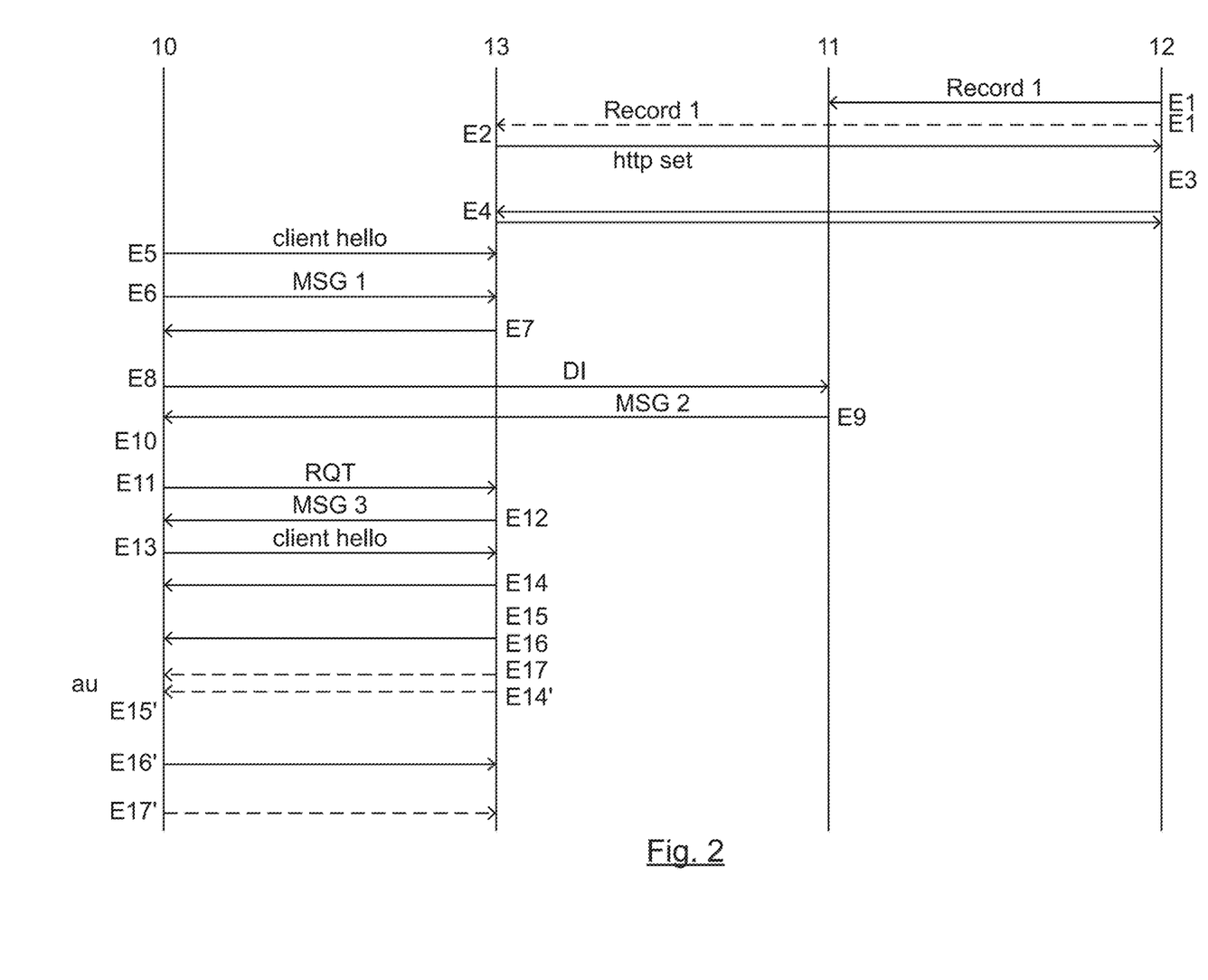
FIG. 2 shows a diagram of exchanges between different communication devices involved in the implementation of the methods for delivering at least one content item and requesting access to at least one content item.

FIG. 2 shows a diagram of exchanges between different communication devices involved in the implementation of the methods for delivering at least one content item and requesting access to at least one content item.

In a step E1, the original server 12 of the content item journal.fr/news/week19 transmits to a naming identifier resolver 11 a message Record 1 such as, for example, a DNS record ESNI type message comprising a cryptographic key associated with the original server 12 and a delegation setting associated with the cache server 13 for the content item referenced journal.fr/news/week19 to the naming identifier resolver 11. An example of such a message Record 1 is given below:

```
ESNI record journal.fr {
    SNI encryption key: C5E74D
    Trusted_entities: {
        journal.fr: 9B5D248 #
    }
}
```

The original server 12 can transmit to the naming identifier resolver 11, in a particular implementation of the methods of the development, a single message Record common to a set of content items which it hosts and which are located on branches of the same URL (Uniform Resource Locator). This message Record common to several content items comprises a cryptographic key associated with the original server 12 and a delegation setting associated with the cache server 13 common to all of these content items.

For example, the naming identifier journal1.fr/news is common to the two content items respectively referenced journal1.fr/news/week19 and journal1.fr/news/week20.

An example of such a common message Record is given below:

```
ESNI record journal1.fr {
    SNI encryption key: A94C7B
    Trusted_entities: {
        journal.fr: D3BA27E
    }
}
```

In this implementation, the terminal 10 determines the validity of the key for each branch of the naming tree of the requested URL starting with the URL of the requested content item journal1.fr/news/week19, then journal1.fr/news and finally journal1.fr. The delegation is valid when the key is valid for at least one of the branches: Thus the number of keys is reduced and the same key can be assigned to groups of complex content items such as a website or a structured multimedia content item.

The naming identifier resolver 11 stores these identifiers associated with the content items in a correspondence table.

In the present methods for delivering at least one content item and requesting access to at least one content item, the original server 12 encrypts, by means of derived cryptographic settings, among other things, from the private key associated with the public key, each identifier of a content item to be delivered associated with a cache server 13 to which it gives authorisation, or delegation, to execute a function of delivering content items.

In the first example described, the public key of the original server 12 is C5E74D. The original server 12 then calculates a digital fingerprint of the identifier of the content item whose delivery is delegated to the cache server 13. This digital fingerprint is signed by the cryptographic key associated with the original server (12). Such a digital fingerprint is for example a hash of the public key associated with the cache server 13, of an identifier of the cache server journal.fr, and of the identifier of the content item. The original server 12 thus determines a delegation setting of the cache server 13 for the content item journal.fr: 9B5D248 #. The delegation setting of the cache server 13 is for example transmitted in the field "Trusted-entities" and the public key of the original server 12 is transmitted in the field "SNI encryption" key of the message Record 1 when the latter is a DNS record ESNI type message.

In a particular embodiment of the methods for delivering at least one content item and for requesting access to at least one content item, the various messages Record are emitted by the original server 12 directly to the cache server 13.

In a step E2, the cache server 13 establishes a communication session with the original server 12 associated with said content item during which the content item is delivered to the cache server 13.

The emission by the cache server 13 of a message of the http get type triggers the procedure of delivering content items.

Unlike known "caching" techniques wherein the content item itself is stored in at least one cache memory of a cache server 13, the methods of the present development rely on storing in at least one cache memory of the cache server 13 all of the messages exchanged between the original server 12 and the cache server 13 leading to the delivery of the content item to the cache server 13.

During a step E3, the original server 12 generates protocol information such as signalling information, such as http headers, cookies, access control, etc., and/or control information intended to be used when delivering a content item to the terminal 10, The protocol information generated is for example a list of header fields that can be adapted. Such a list is for example the following:

```
[
    {"op": "replace", "path": "user-agent", "value": "w"},
    {"Cop": "add", "path": "any", "value": "any"}, //
    the cache can add the fields it wants
]
```

The protocol information generated may comprise instructions for changing the protocol or the protocol version used when downloading the content item between the original server 12 and the cache server 13 in order to adapt to the protocol used by the terminal 10.

Finally, the generated protocol information may also comprise instructions allowing to change the time spacing between messages to reduce throughput, and indicate these changes in control messages.

The protocol information thus generated by the original server 12 is then certified by the original server 12 by means of the cryptographic settings derived, among other things, from the private key associated with the public key of the original server 12. Thus, the integrity of the protocol information thus generated is guaranteed.

In a step E4, the cache server 13 stores, in at least one of its cache memories, all of the messages exchanged, or played, with the original server 12 associated with said content item which follow the emission of the http get message in a HARS (http archive secure) type file for example. The HARS format allows to store messages in a form called "opaque" form, that is to say unchanged, or in an interpretable form, or in a mixed form in order to keep the data messages in encrypted form while leaving all or part of the signalling information readable.

All of the messages recorded by the cache server 13 comprise the messages comprising the protocol information generated and certified by the original server 12 as well as all of the messages conventionally exchanged between the original server 12 and a cache server 13 when downloading a content item. The messages conventionally exchanged between the original server 12 and a cache server 13 when downloading a content item constitute the primitive form corresponding to the flows of packets exchanged when downloading these content items.

An example of the messages exchanged between the original server 12 and the cache server 13 is shown below:

```
HTTP2_SESSION_INITIALISED
- -> protocol = "h2"
- -> source dependency = 206050 (SOCKET)
HTTP2_SESSION_SEND_SETTINGS
- -> settings = ["[id:1 (SETTINGS_HEADER_TABLE_SIZE) value:
65536]"
HTTP2_SESSION_UPDATE_RECV_WINDOW
- -> delta = 15663105
- -> window_size = 15728640
HTTP2_SESSION_SEND_WINDOW_UPDATE
- -> delta = 15663105
- -> stream_id = 0
HTTP2_SESSION_SEND_HEADERS
- -> exclusive = true
- -> end = true
- -> has priority = true
- -> :method: POST
    :authority: www.youtube.com
    :scheme: https
    :path: /api/stats/qoe?event=streamingstats&fmt=243&afmt=251
    content-length: 0
    pragma: no-cache
    cache-control: no-cache
    sec-fetch-mode: no-cors
    origin: https://www.youtube.com
    user-agent: Mozilla/5.0 (Windows NT 10.0; Win64; x64)
    dnt: 1
    content-type: text/plain;charset=UTF-8
    accept: */*
    x-client-data: CJa2yQEIpLbJAQjBtskBCKmdygEI4qjKAQjt
    sec-fetch-site: same-origin
```

At the end of this recording, the messages comprising the protocol information generated and certified by the original server 12 thus all of the messages conventionally exchanged between the original server 12 and a cache server 13 when downloading a content item are stored in the cache server 13. These messages are memorised in a HARS file itself stored in the cache server 13.

The HARS recording format allows to store in a file, or an archive, the various messages carrying the protocol information generated by the original server 12 and the various data messages exchanged, or played, when downloading the content item between the original server 12 and the cache server 13. Such messages are for example compliant with the HTTP2 or QUIC protocols.

In a step E5, the terminal 10 establishes a communication session with the cache server 13, For this purpose, it emits for example a communication session establishment request message of the https ClientHello type to the cache server 13. This message is emitted using the TLS, DTLS or QUIC protocol, in the latter case, the message is then a CHO type message.

In a step E6, the terminal 10 then emits a message MSG1 of the http connect resource type, wherein the resource setting comprises a URL or a naming identifier of the requested content item, that is to say for example journal.fr.

In response to this message MSG1, the cache server 13 transmits, in a step E7, information relating to the content item journal.fr available thereto, such as the delegation setting associated with the cache server 13 for the content item journal.fr or else the public key associated with the original server 12 and possibly an agreed setting of the message ClientHello encrypted with the private key associated with the public key transmitted. Thus, for the content item journal.fr, the cache server 13 transmits the delegation setting 9B5D248 #. Such information relating to the content item journal.fr is for example transmitted in a message ServerHello.

In the case where the resource setting is empty, in response to this message MSG1, the cache server 13 transmits, in step E7, information relating to the content items available thereto as well as a list comprising the various delegation settings associated with the cache server 13 and corresponding to the different content items that the cache server 13 is authorised to deliver. Thus, for example, the cache server 13 transmits the delegation settings for the content items journal.fr and journal1.fr described above.

The steps E8 to E10 described below constitute a phase for checking the authenticity of the delegation settings transmitted by the cache server 13.

Thus, in a step E8, the terminal 10 emits a request for information DI relating to the cache server 13 intended for the naming identifier resolver 11. Such a request for information comprises at least one identifier of the content item journal.fr, for example, for which the terminal 10 wishes to check the delegation setting associated with the cache server 13. The information request DI is for example a message of the DNS query ESNI type.

In a step E9, the naming identifier resolver 11 transmits a message MSG2, such as for example a DNS record ESNI type message, comprising the public key C5E74D associated with the original server 12 and the associated delegation setting 9B5D248 # to the cache server 13 for the content item journal.fr.

In this implementation example, the terminal 10 has a first version V1 of the delegation setting associated with the cache server 13 for the content item journal.fr that it received from the cache server 13 during step E7, and a second version V2 of the delegation setting associated with the cache server 13 for the content item journal.fr that it received from the naming identifier resolver 11 during step E9. This second version V2 of the delegation setting associated with the cache server 13 for the content item journal.fr is considered reliable because it is emitted by a reliable device, namely the naming identifier resolver 11.

During a step E10, the terminal 10 checks the authenticity of the first version V1 of the delegation setting. For this purpose, the terminal 10 uses the ESNI encryption settings, such as for example the public key C5E74D, associated with the original server 12 in order to check the authenticity of the digital fingerprint of the first version V1 of the delegation setting, thus it obtains a first decrypted version DcV1 of the naming identifier of the cache server 13. The first decrypted version DcV1 of the naming identifier gives "journal.fr".

Still during step E10, the terminal 10 also decrypts the second version V2 of the delegation setting associated with the cache server 13 by means of the public key, thus it obtains a second decrypted version DcV2 of the naming identifier of the cache server 13. Here, the second decrypted version DcV2 of the naming identifier thus decrypted gives "journal.fr". The terminal 10 then compares the first decrypted version DcV1 of the naming identifier of the cache server 13 with the second decrypted version DcV2 of the naming identifier of the cache server 13. When the two decrypted DcV1 and decrypted DcV2 versions of the naming identifier associated with the cache server 13 correspond, the authenticity of the delegation setting associated with the cache server 13 for a given content item is checked.

When the authenticity of the delegation setting associated with the cache server 13 for a given content item is checked, the terminal 10 then emits to the cache server 13, in a step E11, a request RQT to replay the HARS file stored in the cache server 13 and associated with the required content item. Such a request is for example a message of the http2 create replay stream type comprising at least an identifier of the original server 12 and an identifier of the required content item.

Indeed, as indicated above, unlike known "caching" techniques wherein the content item itself is stored in at least one cache memory of a cache server 13, the methods of the present development rely on storing in at least one cache memory of the cache server 13 all of the messages played between the original server 12 and the cache server 13 leading to the delivery of the content item to the cache server 13 so that these messages can be replayed between the cache server 13 and the terminal 10 in order to deliver the required content item to the terminal 10.

The term replay consists in repeating, by the cache server 13 and with the terminal 10 or by the terminal 10 and with the cache server 13, the sequence of messages exchanged between the original server 12 and the cache server 13 when downloading the required content item and stored in a HARS file, the replayed messages being able, if necessary, to be modified to adapt to the context wherein they are replayed by means of the protocol information generated by the original server 12 and also stored in the HARS file. For this purpose, modifications can be applied to certain messages comprised in the HARS file during the replay of the sequence of messages.

Thus, in a step E12, the cache server 13 emits a message MSG3 to the terminal 10. The message MSG3 comprises useful settings for establishing a communication session between the terminal 10 and the cache server 13 during which the required content item is intended to be delivered to the terminal 10 as well as cryptographic keys intended to be used in order to allow the distribution of the required content item on the terminal 10. These cryptographic keys are acquired by the cache server 13 during steps E3 and E4.

In a step E13, the terminal 10 then emits a message TLS "ClientHello" to the cache server 13. This message TLS "ClientHello" is encrypted using the cryptographic keys received during step E12.

The cache server 13 decrypts the message "TLS ClientHello" by means of the cryptographic keys and transmits, in a step E14, a message "ServerHello TLS" intended for the terminal 10 in order to establish an HTTPS connection between the cache server 13 and the terminal 10.

In a first implementation of the methods of the development, the modifications to be applied to certain messages of the HARS file are carried out at the cache server 13. The modifications to be applied to certain messages of the HARS file consist in modifying certain settings of the messages stored in the HARS file according to the protocol information generated by the original server 12 and also stored in the HARS file.

In a first variant embodiment of this first implementation, during a step E15, the cache server 13 prepares the replay of the HARS file associated with the content item with the terminal 10 with a view to delivering the required content item to the latter.

For this purpose, the cache server 13 modifies some of the messages stored in the HARS file associated with the required content item in order to adapt them to the emission/reception points, that is to say the cache server 13 and the terminal 10, they are different from those of the initial set of messages, that is to say if they are different from the messages exchanged between the original server 12 and the cache server 13 when downloading the required content item. For this purpose, the cache server 13 carries out these modifications on the basis of the protocol information generated by the original server 12 during step E3. The term modifying the messages stored in the HARS file covers adding, deleting messages or modifying certain message-related settings. Such a list of value modifications is for example:

user-agent: Mozilla/5.0
x-nginx-cache-version: 8.4.1

Once the HARS file associated with the content item is ready, the cache server 13 triggers, in a step E16, the replay of the messages stored in the HARS file and modified during the step E15.

In a second variant embodiment of this first implementation, during a step E17 which follows step E14, the cache server 13 modifies some of the messages stored in the HARS file associated with the required content item in order to adapt them to the points of transmission/reception, when replaying these messages. Thus, in this second variant embodiment of this first implementation, the messages to be modified are modified on the fly.

Just as in the first variant embodiment, the modification of the messages is done on the basis of the protocol information generated by the original server 12 during step E3. Regardless of the variant embodiment, the modifications made to certain messages of the HARS file can also allow to change the protocol used when downloading the content item between the original server 12 and the cache server 13 in order to adapt to the terminal 10. These changes are then indicated in the control messages inserted by the cache server 13. Thus, by way of example, the http get messages stored in the HARS file are replaced by messages of the push http2 type, etc.

Changes to certain messages in the HARS file may also change the time spacing between messages to reduce throughput, and indicate these changes in control messages.

At the end of the replay of all of the messages stored in the HARS file and modified during steps E15 or E17, the required content item is delivered to the terminal 10 which can then broadcast it.

At the end of the replay of all of the messages stored in the HARS file, the terminal 10 also has the protocol information generated by the original server 12 which can be used in order to check the integrity of the data transmitted by the cache server 13.

In a second implementation of the methods of the development, the modifications to be applied to certain messages of the HARS file are carried out at the terminal 10. The terminal 10 modifies certain settings of the messages stored in the HARS file which has been transmitted to the terminal 10 according to the protocol information generated by the original server 12, and themselves comprised in the transmitted HARS file. In this second implementation, the terminal 10 can use additional protocol information in order to modify certain messages comprised in the HARS file. Such additional protocol information is not comprised in the HARS file, it is transmitted separately to the terminal 10 by the cache server 13 in a step E14'. This is due to the fact that in this case, the protocol information comprised in the HARS file relates to the identity of the messages to be modified with a view to replay, and the additional protocol information relates to the values to be applied to the messages identified in the protocol information when they are modified. The additional protocol information is generated by the cache server 13 based on information received from the terminal 10 during steps E12 to E14. Thus, if the protocol information can be common to several terminals, the additional protocol information is specific to the terminal 10.

In a first variant embodiment of this second implementation, during a step E15', the terminal 10 modifies, creates or deletes values of header fields of certain messages initially exchanged between the original server 12 and the cache server 13 with a view to replaying, between the cache server 13 and the terminal 10, the sequence of messages recorded during step E4. The list of header field values that can be modified is for example:

[
 {"op": "replace", "path": "user-agent", "value": "Mozilla/5.0 (Linux; Android 7.0; SM-G892A Build/NRD90M; wv) AppleWebKit/537.36 (KHTML, like Gecko) Version/4.0 Chrome/60.0.3112.107 Mobile Safari/537.36 "},
 {"op": "add", "path": "/x-nginx-cache-version", "value": "8.4.1"},
]

Once the HARS file associated with the content item is ready, the terminal 10 triggers, in a step E16', the replay of the messages stored in the HARS file and modified during the step E15'.

In a second variant embodiment of this second implementation, during a step E17' which follows step E14, the terminal 10 modifies some of the messages stored in the HARS file associated with the required content item in order to adapt them to the points of transmission/reception, when replaying these messages. Thus, in this second variant embodiment of this second implementation, the messages to be modified are modified on the fly.

Just as in the first variant embodiment, the modification of the messages is done on the basis of the protocol information generated by the original server 12 during step E3.

Regardless of the variant embodiment, the modifications to be made to certain messages of the HARS file can also allow to change the protocol used when downloading the content item between the original server 12 and the cache server 13 in order to adapt to the terminal 10. These changes are then indicated in the control messages inserted by the terminal 10. Thus, by way of example, the http get messages stored in the HARS file are replaced by messages of the push http2 type, etc.

The terminal 10 may also change the time spacing between messages to reduce throughput, and indicate these changes in the control messages.

Both in the first implementation and in the second implementation, the terminal 10 has a version certified by the original server 12 of the protocol information, the terminal 10 can therefore check, by means of the cryptographic keys received, that the modifications made by the cache server 13 or the terminal 10 comply with the instructions of the original server 12.

At the end of the replay of the messages stored in the HARS file and modified during step E15' or E17', the required content item is delivered to the terminal 10 which can then broadcast it.

Figure 3:
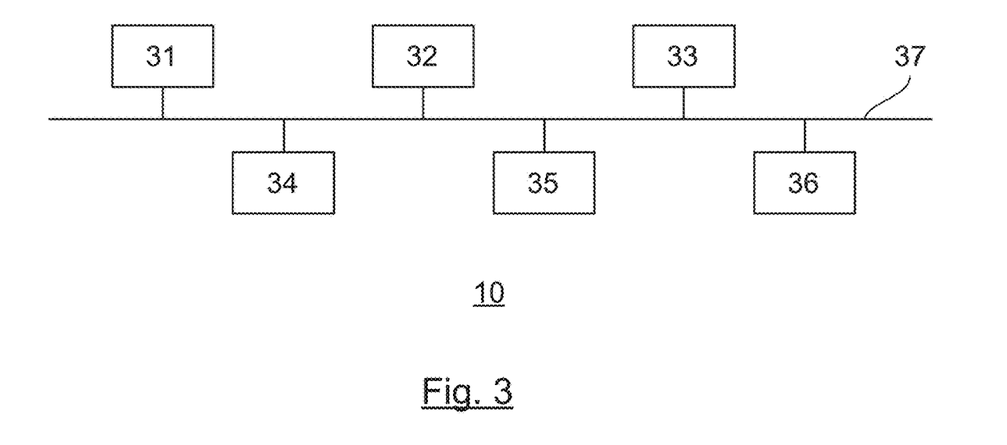
FIG. 3 shows a terminal 10 according to one embodiment of the development. Such a terminal 10 is able to implement the different embodiments of the method for requesting resolution of a naming identifier.

FIG. 3 shows a terminal 10 according to one embodiment of the development. Such a terminal 10 is capable of implementing the different embodiments of the method for requesting access to at least one content item according to FIG. 2.

A terminal 10 can comprise at least one hardware processor 31, a storage unit 32, an input device 33, a display device 34, an interface 35, and at least one network interface 36 which are connected together through a bus 47. Of course, the elements constituting the terminal 10 can be connected by means of a connection other than a bus.

The processor 31 controls the operations of the terminal 10. The storage unit 42 stores at least one program for the implementation of the method according to one embodiment of the development to be executed by the processor 31, and various data, such as settings used for calculations performed by the processor 31, intermediate data for calculations performed by the processor 31, etc. The processor 31 may be any known and suitable hardware or software, or a combination of hardware and software. For example, the processor 31 may be formed by dedicated hardware such as a processing circuit, or by a programmable processing unit such as a Central Processing Unit which executes a program stored in a memory thereof.

The storage unit 32 may be formed by any suitable means capable of storing the program(s) and data in a computer readable manner. Examples of storage unit 32 comprise non-transitory computer-readable storage media such as semiconductor memory devices, and magnetic, optical, or magneto-optical recording media loaded into a read and write unit.

The input device 33 can be formed by a keyboard, a pointing device such as a mouse to be used by a user to enter controls. The display device 34 can also be formed by a display module, such as for example a graphical user interface or GUI.

The interface 35 provides an interface between the terminal 10 and another device.

At least one network interface 36 provides a connection between the terminal 10 and the cache server 13, and the resolver 11.

Figure 4:
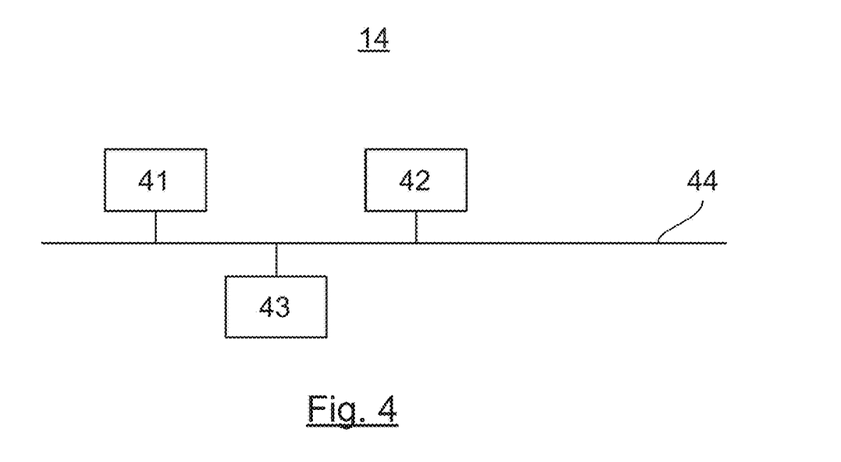
FIG. 4 shows a cache server capable of implementing the different embodiments of the naming identifier resolution method.

FIG. 4 shows a cache server 13 able to implement the different embodiments of the method for delivering at least one content item according to FIG. 2.

A cache server 13 can comprise at least one hardware processor 41, a storage unit 42, and at least one network interface 43 which are connected together through a bus 44. Of course, the constituent elements of the cache server 13 can be connected by means of a connection other than a bus.

The processor 41 controls the operations of the cache server 13. The storage unit 52 stores at least one program for the implementation of the method according to one embodiment to be executed by the processor 41, and various data, such as settings used for calculations performed by the processor 41, intermediate data of calculations carried out by the processor 41, etc. The processor 41 may be any known and suitable hardware or software, or a combination of hardware and software. For example, the processor 41 can be formed by dedicated hardware such as a processing circuit, or by a programmable processing unit such as a Central Processing Unit which executes a program stored in a memory thereof.

The storage unit 42 may be formed by any suitable means capable of storing the program(s) and data in a computer readable manner. Examples of storage unit 42 comprise non-transitory computer-readable storage media such as semiconductor memory devices, and magnetic, optical, or magneto-optical recording media loaded into a read and write unit.

At least one network interface 43 provides a connection between the cache server 13, the resolver 11, the terminal 10 and the original server 12.

The invention claimed is:

1. A method for delivering at least one content item to at least one terminal, the method being implemented by a cache server which can be accessed by the at least one terminal, and comprising:
    implementing during a first phase:
        recording a sequence of messages exchanged between the cache server and an original server hosting the content item during a communication session established with the original server associated with the content item and during which the content item is delivered to the cache server;
    implementing during a second phase:
        receiving a request for access to the content item emitted by the terminal; and
        in response to the request for access to the content item, replaying, with the at least one terminal, the sequence of recorded messages, resulting in the delivery of the content item.

2. The method for delivering at least one content item to at least one terminal according to claim 1, comprising after receiving a request for access to the content item, transmitting to the terminal a message comprising at least one setting, called the delegation setting, relating to an authorization to deliver the content item by the cache server.

3. The method for delivering at least one content item to at least one terminal according to claim 1, wherein part of the messages exchanged between the cache server and the original server comprise information relating to the signalling and/or controlling of the sequence of recorded messages.

4. The method for delivering at least one content item to at least one terminal according to claim 3, comprising modifying at least one of the messages of the sequence of messages recorded by means of the information relating to the signalling and/or controlling of the sequence of recorded messages.

5. The method for delivering at least one content item to at least one terminal according to claim 3, comprising transmitting additional information relating to the signalling and/or controlling of the sequence of recorded messages to the terminal.

6. The method for delivering at least one content item to at least one terminal according to claim 4, wherein the modifying at least one of the messages of the recorded sequence is triggered by the reception of a replay request emitted by the terminal.

7. The method for delivering at least one content item to at least one terminal according to claim 2 comprising, prior to the transmitting the delegation setting, receiving a message comprising the delegation setting.

8. A method for accessing a content item, the method being implemented by a terminal and comprising:
    emitting a request for access to the content item to a cache server; and
    replaying, with the cache server, a sequence of messages exchanged between the cache server and an original server associated with the content item during a communication session established between the cache server and the original server during which the content item is delivered to the cache server, the sequence of messages having been recorded by the cache server, resulting in the delivery of the content item to the terminal.

9. The method for accessing a content item according to claim 8, comprising, prior to the replaying, receiving a message, emitted by a cache server, comprising at least one setting, called delegation setting, relating to an authorization for executing a function of delivering the content item by the cache server.

10. The method for accessing a content item according to claim 8, wherein part of the messages exchanged between the cache server and the original server comprise information relating to the signalling and/or controlling of the sequence of recorded messages.

11. The method for accessing a content item according to claim 10, comprising receiving additional information relating to the signalling and/or controlling of the sequence of recorded messages.

12. The method for accessing a content item according to claim 10, comprising modifying at least one of the messages of the sequence of messages recorded by means of the information relating to the signalling and/or controlling of the sequence of recorded messages.

13. The method for accessing a content item according to claim 9, comprising a phase of checking the authenticity of the delegation setting comprising:
    emitting a request for information relating to the cache server to a naming identifier resolver;
    receiving a message comprising a cryptographic key associated with the original server associated with the content item and the delegation setting; and
    checking the delegation setting transmitted by the cache server using the cryptographic key and the delegation setting transmitted by the naming identifier resolver.

14. A cache server which can be accessed by at least one terminal, the cache server hosting data being authorized to deliver at least one content item to the terminal, the cache server comprising:
    a processor; and
    a non-transitory computer readable data storage medium having recorded thereon computer program instructions, which when executed by the processor, implement a method for delivering the at least one content item to the at least one terminal,
    wherein the method comprises:

during a first phase:
  recording a sequence of messages exchanged between the cache server and an original server hosting the content item during a communication session established with the original server associated with the content item and during which the content item is delivered to the cache server;
during a second phase:
  receiving a request for access to the content item emitted by the terminal; and
  in response to the request for access to the content item, replaying, with the terminal, the sequence of recorded messages, resulting in the delivery of the content item.

15. A terminal requiring access to a content item, and comprising:
  a processor; and
  a non-transitory computer readable data storage medium having recorded thereon computer program instructions, which when executed by the processor, implement a method for accessing the content item,
wherein the method comprises:
  emitting a request for access to the content item to a cache server at which the content item is memorized; and
  replaying, with the cache server, a sequence of messages exchanged between the cache server and an original server associated with the content item during a communication session established between the cache server and the original server during which the content item is delivered to the cache server, the sequence of messages having been recorded by the cache server, resulting in the delivery of the content item to the terminal.

* * * * *